Dec. 20, 1966   J. C. POLAK   3,292,758
COOLANT SYSTEM
Filed Feb. 24, 1964
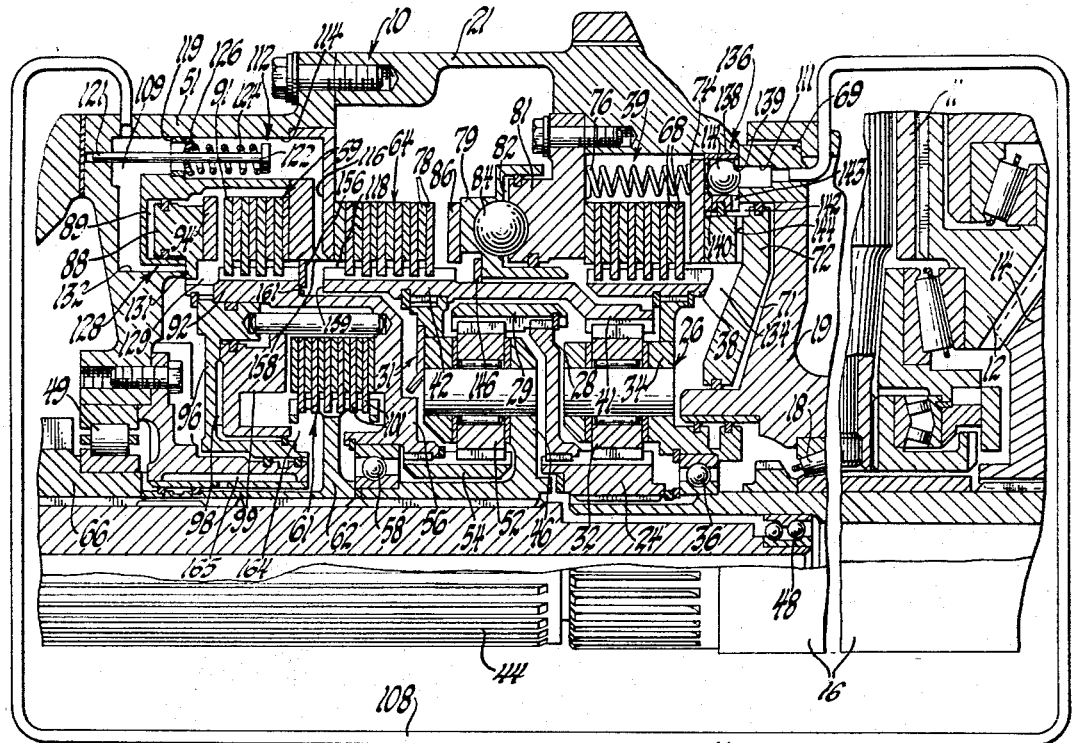
INVENTOR.
James C. Polak
BY
a. M. Neiter
ATTORNEY United States Patent Office 3,292,758
Patented Dec. 20, 1966

3,292,758
COOLANT SYSTEM
James C. Polak, Indianapolis, Ind., assignor to General Motors Corporation, Detroit, Mich., a corporation of Delaware
Filed Feb. 24, 1964, Ser. No. 346,946
22 Claims. (Cl. 192—113)

This invention relates to coolant systems and more particularly to coolant systems for the friction devices of a transmission.

In transmissions having friction brakes and clutches which selectively control transmission operation, it is desirous that those friction brakes and clutches subjected to high heat levels on application be efficiently cooled to prevent harm to their friction parts from overheating and to minimize wear.

One cooling problem area is found in the field of cross-drive transmissions used in off-the-road vehicles and the like since certain of the friction devices in transmissions of this type are often subjected to heavy work duties to effect a desired transmission operation. Such cross-drive transmissions can be designed to provide different steering systems for different degrees of turn and for varying load conditions and in this respect reference is made to the copending application Ser. No. 346,661 filed in the name of Tuck et al. and entitled, Transmission. A cross-drive transmission of this type has a pair of spaced two speed and reverse cross-drive units including ground brakes for vehicle braking and steering effectively combined to provide at least two different straight forward speed ranges and a straight reverse speed range, drive brake steering in two speed ranges, geared steering in one speed range and pivot steering in two speed ranges. For straight forward and reverse drive, identical drive ratios are established in each of the cross-drive units to provide the two straight forward speed ranges and the straight reverse speed range. For turns of relatively short radius, the steering system referred to as drive-brake steering is provided by selectively engaging a friction device in one cross-drive unit to provide either a high or low speed drive to one output shaft of the cross-drive transmission while the other cross-drive unit is conditioned for neutral and the other output shaft of the cross-drive transmission is either retarded or stopped by its connected ground brake. For moving the vehicle through a constantly curved path for prolonged intervals of time, the steering system referred to as geared steering is used and is provided by the engagement of a friction device in one cross-drive unit to establish one speed ratio and the engagement of a friction device in the other drive unit to provide a different speed ratio. For increased vehicle mobility, the steering system referred to as pivot steering is provided by selectively engaging a friction device in one of the cross-drive units to provide a forward speed in either a high or low speed range, retarding the output shaft of the other cross-drive unit from a forward motion to a stop and then changing to a complete reversal by engagement of a friction device in the latter cross-drive unit to effect a reverse speed while the output shaft of the other cross-drive unit is under full power in a forward speed range.

It is apparent that the work duties of the several friction devices to effect the different steering systems and provide vehicle braking are variable and will produce without sufficient cooling high heat levels which may be harmful to the working friction parts as for example when the ground brakes are applied to retard and stop the vehicle, when the cross-drive units output shafts are heavily loaded and a clutch or brake in either unit is engaged to establish a particular drive ratio such as low and reverse and again when a ground brake is permitted to slip such as in drive brake steering to move the vehicle through a curved path. Since the work duties are variable and peculiar to each transmission operating condition, the flow of coolant required to efficiently cool the various friction devices when operating under a particular work load is necessarily made variable. For this reason, it is desired to control the coolant flow to the various friction devices in relation to their cooling demands both in vehicle braking and steering operation so that there occurs an efficient transfer of heat to prevent harm to the friction parts and to minimize wear.

The invention as illustrated in a preferred embodiment is employed in a cross-drive transmission having the same gearing arrangement as disclosed in Tuck et al., supra, and includes spaced right and left two speed and reverse planetary gear drive units. A cross-drive input shaft provides input to a right and a left reversing planetary gear set and to a right and a left forward planetary gear set of the right and left drive units respectively. Output from the right and left reversing planetary gear sets and the right and left forward planetary gear sets is to right and left output shafts respectively which are drive connected to the vehicle propelling devices. The reversing planetary gear sets are each operable upon the engagement of a reverse friction brake to provide a reverse drive in reduction to the output shaft to which they are drive connected and the forward planetary gear sets are each operable upon the engagement of a low friction brake to provide reduction drive and upon the application of a high friction clutch a direct drive to their connected output shaft. The forward planetary gear sets are outboard of the reversing planetary gear sets and right and left vehicle or ground friction brakes incorporated into the right and left forward planetary gear sets are operable to selectively retard and stop the right and left output shafts.

In the coolant system for each drive unit coolant chambers are provided for the reverse friction brake, the ground friction brake and the low friction brake which when supplied with a controlled flow of coolant cool the friction parts of these devices with two of these coolant chambers also being arranged to cool by conduction the high friction clutch. An output driven pump delivers coolant under pressure to a main supply passage and thence by the main supply passage to a main coolant supply chamber with pressure in the main coolant supply chamber and connected main supply passage being regulated to a predetermined pressure by a regulator valve which exhausts overage to the ground brake coolant chamber. A portion of the coolant in the main coolant supply chamber is permitted to pass at a controlled rate through a control orifice to the low brake coolant chamber by a low brake coolant supply valve only when this valve is open which occurs when the low brake apply piston is operated to engage the low friction brake.

A baffle between the ground brake coolant chamber and the low brake coolant chamber is effective to seal that coolant chamber having the higher pressure from that coolant chamber having the lower pressure and in this manner prevents the bypassing of coolant from the working friction parts of either the ground friction brake or the low friction brake. The main supply passage of the coolant system which is being regulated by the regulator valve to a predetermined pressure is connected to the reverse brake coolant chamber by a reverse coolant supply valve comprising a ball valve which is urged to an open position by coolant pressure when the reverse brake apply piston is operated to engage the reverse friction brake. This valve when opened delivers a portion of the coolant in the main supply passage through a control orifice at a controlled rate to the reverse brake coolant chamber. A baffle is also provided between the reverse brake coolant chamber and the ground brake coolant chamber and is effective to seal that coolant chamber having the higher pressure from that coolant chamber having the lower pressure to prevent the coolant from bypassing the working friction parts of either the ground friction brake or reverse friction brake.

The coolant system is charged by the pump during steering and braking operation and delivers coolant to the friction devices by the named valves in relation to the friction devices coolant demands in the manner to be described so that the heat developed by the friction devices is efficiently transferred. With the low friction brake and the reverse friction brake released and thus their coolant supply valves closed, the regulator valve opens at the predetermined pressure which is below that pressure normally delivered by the pump and coolant is delivered to the ground brake coolant chamber so that the ground friction brake will be cooled by all coolant made available by the coolant system as this brake is engaged to provide either vehicle braking in the high straight forward speed range or drive brake steering in one direction since these engagements require the heaviest work duties in the transmission.

For low drive and reverse drive in either drive unit, such as in low straight forward drive and straight reverse drive and when geared and pivot steering is in use, the ground friction brake receives the coolant pumped in excess of that required to satisfy the flow of coolant at the predetermined pressure through either the control orifice and low brake coolant supply valve admitting coolant to the low brake coolant chamber when the low friction brake is engaged or through the reverse brake coolant supply valve and control orifice admitting coolant to the reverse brake chamber when the reverse friction brake is engaged. The work duty of the ground friction brake when engaged while the transmission is operating in any of these conditions is lighter than that in high straight forward drive and drive brake steering and the coolant flow available to the ground friction brake under these conditions which may be about half that in high straight forward drive is sufficient.

By the provision of the baffles, the several coolant chambers are closed to one another so that coolant will not bypass any of the working friction parts and flow through a released friction device. The coolant is thus forced to flow against the resistance provided by the working friction parts and by the operation of the several valves is supplied to the friction devices in relation to their work duty to maintain efficient transfer of heat at all times during vehicle braking and the use of the several different steering systems.

It is an object of this invention to provide an improved coolant system for cooling the friction devices of a transmission.

It is another object of this invention to provide a coolant system for a transmission supplying coolant to friction devices in the transmission in relation to their work duties when the friction devices are selectively operated to establish a drive and to retard and stop a rotating member.

Another object of this invention is to provide in a cross-drive transmission offering a plurality of steering systems by two separately controlled drive units, a coolant system supplying coolant to the friction devices establishing the different steering systems and providing vehicle braking in relation to their work duty including a regulator valve maintaining coolant in a main supply passage at a predetermined pressure and exhausting overage to a friction device which sustains a heavy work load when engaged and a valve operable to open when a friction device which sustains a lighter work load is engaged to deliver a portion of the coolant from the main supply passage at a controlled rate to the latter friction device when engaged.

Another object of this invention is to provide in a cross-drive transmission having spaced drive units each providing at least two different forward drives and a reverse drive to an output shaft and having a ground brake for retarding and stopping the output shaft, a coolant system for each drive unit having an input driven pump delivering coolant under pressure during vehicle steering and braking to a main coolant supply passage where coolant is maintained by a regulator valve at a predetermined pressure and overage is supplied to a ground brake coolant chamber to cool the ground brake with a supply valve operable when the motor of a forward friction device is operated to establish a forward drive to permit a portion of the coolant in the supply passage to enter a forward coolant chamber at a controlled rate to cool the forward friction device, and another supply valve operable when the motor of a reverse friction device is operated to effect a reverse drive to permit a portion of the coolant in the supply passage to enter a reverse coolant chamber at a controlled rate to cool the reverse friction device and baffles separating the ground brake coolant chamber and forward coolant chamber and the ground brake coolant chamber and reverse coolant chamber with these baffles being operable in response to the pressures in adjacent chambers to seal that chamber having the higher pressure from that chamber having the lower pressure to prevent the coolant from bypassing the ground brake, forward and reverse friction devices when they are working.

These and other objects of the invention will be more apparent from the following description and drawing of the preferred embodiment of the invention.

FIGURE 1 is a longitudinal sectional view through the left-hand drive unit of a cross-drive transmission showing the coolant system.

FIGURE 2 is an enlarged view taken from FIGURE 1 of the reverse brake coolant supply valve.

FIGURE 3 is an enlarged view taken from FIGURE 1 of the baffle between the ground brake coolant chamber and the reverse brake coolant chamber.

FIGURE 4 is an enlarged view of a modified form of the reverse brake coolant supply valve shown in FIGURES 1 and 2.

The invention is illustrated in a cross-drive transmission arrangement having right and left-hand units effective to provide at least two straight forward speeds and a straight reverse speed, drive brake steering in two speed ranges, geared steering in one speed range and pivot steering in two speed ranges and vehicle braking. This cross-drive gearing arrangement is the subject of the copending application in the name of Tuck et al. mentioned previously and is used to demonstrate the principles of operation of this invention. Since both the right and left-hand drive units are identical only the left-hand drive unit has been shown in FIGURE 1 and reference may be made to Tuck et al., supra, for a more complete and detailed description of the various transmission parts and cross-drive gearing arrangement.

Referring now to the left-hand drive unit which is generally designated at 10, input to this drive unit is by an input sleeve 11 drive connected to a bevel gear 12 which meshes with a driven bevel gear 14 which is drive connected to the cross-drive input shaft 16. The cross-drive input shaft 16 at a point leftward of sleeve 11 is rotatably supported by an antifriction bearing 18 in an annular retaining plate 19 which is rigidly secured to the main transmission housing 21. Shaft 16 provides input to the right and left-hand drive units and for that purpose, as shown in the left-hand drive unit 10, is splined to a reverse sun gear 24 of a reversing planetary gear set 26 and by a hub 28 to a ring gear 29 of a forward planetary gear set 31. The reversing planetary gear set 26 has a plurality of planetary pinions 32 meshing with the sun gear 24 and journal on a reverse planet carrier assembly 34 which is rotatably supported by an anti-friction bearing 36 on shaft 16 and connected at its outer radius to a drum 38 which may be held stationary by a reverse friction brake generally designated at 39.

The panetary pinions 32 also mesh with a ring gear 41 integral with an annular drum 42 which is connected to output shaft 44 via the output planet carrier assembly 46 of the forward planetary gear set 31 which is located within the drum 42. The inboard end of the output shaft 44 has a reduced diameter rotatably supported by an anti-friction bearing 48 in a counterbore in the outboard end of cross-drive input shaft 16 with the outboard end of shaft 44 being rotatably supported by an anti-friction bearing 49 in an outboard transmission housing assembly 51 rigidly secured to the main transmission housing 21.

In the forward planetary gear set 31, planetary pinions 52 journaled on the output planet carrier assembly 46 mesh with the ring gear 29 and with a sun gear 54 splined to a drum 56 which is rotatably supported at its inner radius by an anti-friction bearing 58 on the hub of carrier assembly 46 which is splined to the output shaft 44. Drum 56 may be held stationary by a low friction brake generally designated at 59 or drive connected by a direct drive or high friction clutch generally designated at 61 to a hub 62 splined to the output shaft 44.

A vehicle or ground friction brake and often referred to as a service brake generally designated at 64 located between the reverse friction brake 39 and the low friction brake 59 is operable to retard and stop rotation of the drum 42 and the connected output planet carrier assembly 46 and output shaft 44.

In each of the right and left-hand drive units, as for example, in the left-hand drive unit 10, reverse ratio drive is established by engaging the reverse friction brake 39, the other drive establishing devices being disengaged to hold the planet carrier assembly 34. Then the cross-drive input shaft 16 drives the reverse sun gear 24 in a forward direction and rotates the pinions 32 to drive the ring gear 41 and connected output planet carrier assembly 46 and the output shaft 44 in the reverse direction and at a reduced speed. Low ratio drive is provided by engaging the low friction brake 59 to hold stationary the sun gear 54 of the forward planetary gear set 31, the other drive establishing devices being disengaged. The cross-drive input shaft 16 then drives the ring gear 29 in the forward direction to orbit the pinions 52 about the sun gear 54 to drive the output planet carrier assembly 46 and connected output shaft 44 in the forward direction at a reduced speed. High ratio drive, which is a direct drive ratio, is established by engaging the high friction clutch 61 to prevent relative rotation between the sun gear 54 and the output shaft 44. This prevents relative rotation between the sun gear 54, pinions 52 and ring gear 29 to lock up the forward planetary gear set 31 to provide a direct drive from the cross-drive input shaft 16 to the output shaft 44. Output from the output shaft 44 is by a spur gear 66 splined to the outboard end of the output shaft 44.

The cross-drive transmission may be operated by selectively engaging the friction clutches and brakes in the right and left-hand drive units to provide, for example, straight and forward drive in low with both low friction brakes engaged, straight high forward drive with both high friction clutches engaged or straight reverse drive with both reverse friction brakes engaged. Clutch brake or drive brake steering may be obtained in either low or high speed ranges by leaving either the low friction brake or the high friction clutch engaged in one of the drive units and disconnecting the drive in the other drive unit for neutral operation and engaging in the latter drive unit the ground brake to either retard or stop the output shaft of the latter drive unit. Geared steering is provided by engaging either the low friction brake in one drive unit for low ratio drive and the high friction clutch in the other drive unit for high ratio drive for turning in one direction along a constantly curved path and reversing this operation for turning in the opposite direction. Pivot steering may also be obtained in either low or high speed ranges by leaving either the low friction brake or the high friction clutch engaged in one drive unit, disengaging forward drive in the other drive unit and engaging the reverse ratio drive in the latter drive unit with this operation being reversed to obtain pivot steering in the opposite direction. A table showing the above operation in detail appears in Tuck et al., supra.

Referring now particularly to the brake and clutch motors which are operable to engage the friction brakes and clutches, the reverse friction brake 39, employed to hold the carrier assembly 34 of the reversing planetary gear set 26, is located in the main transmission housing 21 and has a plurality of reverse brake friction plates 68 with alternate plates splined at their outer radius to the transmission housing 21 and intermediate plates splined at their inner radius to the drum 38 which is connected to the carrier assembly 34. The retaining plate 19 in cooperation with a rim 69 which rigidly secures plate 19 by bolts, not shown, to the transmission housing 21 provides a chamber 71 in which a reverse brake apply piston 72 operates to provide a reverse brake motor. When fluid under pressure is supplied to chamber 71, the piston 72 moves to the left to urge an annular pressure plate 74 leftwardly against retraction springs, such as spring 76, to engage the friction plates 68 to lock the carrier assembly 34 to the transmission housing 21. When chamber 71 is exhausted, the retraction springs 76 acting on pressure plate 74 return piston 72 to its fully released position.

The ground friction brake 64 which retards the output shaft 44 through the output planet carrier assembly 46 may be employed both as a mechanically operated vehicle service brake and parking brake and as a hydraulically operated steering brake and includes a plurality of friction plates 78 with alternate plates splined at their inner radius to drum 42 and intermediate plates splined at their outer radius to the transmission housing 21. A ground brake motor is provided by an external annular piston 79 received on a fixed internal annular cylinder 81 which is rigidly secured to the transmission housing 21. Both piston 79 and cylinder 81 have contiguous annular surfaces providing a chamber 82 and having a plurality of mating ball ramps and balls 84. An annular pressure plate 86 located between the piston 79 and the right most friction plate 78 is slidably mounted on fixed pins, not shown, so that the pressure plate 86 is axially movable and fixed against rotation. When fluid under pressure is supplied to chamber 82 which occurs only when the brake 64 is used as a steering brake, the piston 79 urges the annular pressure plate 86 leftwardly to engage the friction plates 78. On exhaust of chamber 82 suitable retraction springs, not shown, acting on pressure plate 86 retract the piston 79 to its fully released position. Piston 79 may also be connected to suitable linkage, not shown, to mechanically apply the ground friction brake for service use such as vehicle braking and parking by rotating the piston 79 to cause the ball ramps and balls 84 to provide brake engagement.

The low friction brake 59, which is operative to brake the sun gear 54 of the forward planetary gear set 31, includes a low brake apply piston 88 which operates in a chamber 89 provided by a suitable recess in assembly 51 to provide a low brake motor. A plurality of friction plates 91 provides a braking medium with alternate plates splined at their inner radius to a radial extension 92 of drum 56 and intermediate plates splined at their outer radius to assembly 51. When fluid under pressure is supplied to chamber 89, the piston 88 urges an annular pressure plate 94 to engage and apply to the friction plates 91 a brake engaging load to prevent rotation of the sun gear 54 to provide the low ratio drive. Suitable retraction springs, not shown, acting on the pressure plate 94 return the piston 88 to its fully retracted position when chamber 89 is exhausted.

The high friction clutch 61 includes an annular cylinder 96 fixed for rotation with drum 56 and this cylinder provides a chamber 98 in which an apply piston 99 operates to provide a high clutch motor. A plurality of friction plates 101 provides the clutching medium with alternate plates splined at their outer radius to drum 56 and intermediate plates splined at their inner radius to the hub 62. When fluid under pressure is supplied to chamber 98, the friction on plate 101 are engaged by apply piston 99 to prevent relative rotation between the sun gear 54 and the output shaft 44 to lock up to forward planetary gear set 31 and provide the direct drive to the output shaft 44. Suitable reaction springs, not shown, retract the piston 99 when fluid is exhausted from chamber 98.

*Coolant system*

The coolant fluid from the coolant system, which collects in the sump 102 located in the lower portion of the transmission housing 21 and transmission assembly 51 is supplied to the coolant system by an output driven pump 104 which may be driven by either one of the bevel gears 12 or 14. The pump 104 when operating receives coolant which is preferably oil from the sump 102 through an intake line 106 and delivers this coolant under pressure to a main coolant supply line 108 which is connected at one end to a main coolant supply chamber 109 provided in transmission assembly 51 and connected at the other end to a coolant supply port 111 in rim 69. The pressure of the coolant in main coolant supply line 108 is regulated to a predetermined pressure which is below that pressure normally delivered by the pump 104 by a coolant regulator valve 112 located in a bore 114 in transmission assembly 51 connecting the chamber 109 to a ground brake coolant supply passage 116. Passage 116 is angled at its exit so as to always direct coolant flow to ground brake coolant chamber generally designated at 118 to cool the ground brake friction plates 78 with the overage from regulator valve 112.

The regulator valve 112 has an annular valve seat 119 fixed in bore 114 and a rod 121 fixed at its left-hand end to the transmission assembly 51 extending through the valve seat 119 and having at its right-hand end an integral spring seat collar 122. A prestressed coil spring 124 mounted on rod 121 engages at its right-hand end collar 122 and at its left-hand end an annular valve element 126 which is apertured to closely fit rod 121 with a minimum of clearance and urged to engagement at its outer radius with the valve seat 119 under the biasing force of the prestressed spring 124. Regulator valve 112 is preset to open at a predetermined pressure existing in chamber 109 and exhaust overage past the valve seat 119 and valve element 126 to passage 116 and thence to chamber 118.

Coolant in the main coolant supply chamber 109 may be delivered by a low brake coolant supply valve 128 to a low brake coolant chamber generally designated at 129 to cool the low brake friction plates 91 when the latter are urged into engagement. Valve 128 is only open when the low brake is engaged by the apply piston 88 and for that purpose low brake apply piston 88 has a radially inwardly extending projection 131 which blocks a control orifice 132 when apply piston 88 is fully retracted by its retraction springs and opens the orifice 132 to the coolant chamber 129 when fluid pressure is supplied to chamber 89 to move the apply piston 88 rightwardly to engage the low friction brake to permit a controlled rate of coolant to flow to coolant chamber 129 during brake engagement.

Coolant in the reverse brake coolant supply port 111, which is connected to main supply line 108, is communicated with a reverse brake coolant chamber generally designated at 134 to cool the reverse brake friction plates 68 by a reverse brake coolant supply valve 136. This valve as best shown in FIGURE 2 has an annular ring 138 which is rigidly secured by bolts, not shown, to rim 69. Ring 138 has an axially extending counterbore 139 freely accommodating a ball 141. The ball 141 is sized so that when the reverse friction brake is released, the pressure plate 74 under the influence of retraction springs 76 contacts with and yieldingly holds the ball 141 on the seat provided by the port 111 which for that purpose is circular and has a diameter less than the diameter of the ball. When the reverse friction brake 39 is engaged by the supply of fluid pressure to chamber 71, the piston 72 is urged leftwardly to move pressure plate 74 into engagement with the friction plates 68. As pressure plate 74 moves leftwardly and out of engagement with the ball 141 the coolant pressure in supply port 111 acting on the ball 141 moves the ball 141 leftward until it bottoms out on the step 140 of the counterbore 139. Leftward movement of ball 141 off its valve seat allows coolant to enter a sealed annular chamber 142 at the right of ring 138 through the counterbore 139 and a radial groove 143 in the right-hand face of ring 138 which connects counterbore 139 to chamber 142. Coolant in chamber 142 passes at a controlled rate through a control orifice 144 in piston 72 to the reverse brake coolant chamber 134 where it cools the reverse brake friction plates 68.

During the engagement of any of the above brakes, their friction plates offer resistance to flow of coolant. Since the coolant chambers 118, 129 and 134 which are provided by the construction of this gearing arrangement would normally be open to one another, coolant would be permitted by the open chambers to flow through the released brake packages bypassing the working brake because of the resistance to flow provided by the working brake. To prevent bypassing of coolant by the working brake as between the ground friction brake 64 and reverse friction brake 39, there is provided an annular ring 146 which acts as a baffle slidably fitted on the drum 42 and is best shown in FIGURE 3. The ring provides a seal between the ground brake coolant chamber 118 and the reverse brake coolant chamber 134 by the combination of its diametral fit on the drum 42 and the abutment of either its right-hand face 148 with face 149 of ground brake apply piston 79 or the abutment of its left-hand face 151 with face 152 of pressure plate 86 with the abutment of these faces being effected by the differential pressure acting on the ring 146. For example, if the coolant pressure in the reverse brake coolant chamber 134 is higher than the coolant pressure in the ground brake coolant chamber 118, the ring 146 will be forced by the higher pressure in chamber 134 to move to the left to abut its face 151 with the pressure plate face 152 as shown in FIGURE 3. On the other hand, if the pressure in chamber 118 is higher than that in chamber 134, the ring 146 will be moved rightwardly to abut its face 148 with the piston face 149 as shown by the phantom lines in FIGURE 3. In this manner, the ring 146 is automatically moved to a sealing position to seal that coolant chamber having the higher coolant pressure from that coolant chamber having the lower coolant pressure to prevent coolant from bypassing the working friction members of these brakes which during engagement offer resistance to flow of coolant.

In like manner, except for a different environment, an annular ring 156 is slidably mounted in a bore 158 in transmission assembly 51 with its right-hand face being abuttable with the drum face 159 on drum 42 and its left-hand face as shown in FIGURE 1 being abuttable with the drum face 161 of drum 56. The annular ring 156 by the combination of its diametral fit in the bore 158 and the abutment of either its right-hand face with the drum face 159 or its left-hand face with the drum face 161 effectively provides a seal between the low brake coolant chamber 129 and the ground brake coolant chamber 118. If the coolant pressure in chamber 118 is higher than that in chamber 129, the ring 156 is held by the higher pressure in chamber 118 in the position shown in FIGURE 1. On the other hand, if the pressure in chamber 129 is higher, the ring 156 is moved by this higher pressure to abut its right hand face with the drum face 159. Thus, coolant pressure is not permitted to bypass the working friction members of either of these brakes and flow in a direction which offers a lower resistance to coolant flow.

FIGURE 4 shows a modified form of the reverse brake coolant supply valve 136 shown in FIGURES 1 and 2 with identical parts having identical numerals and modified parts having identical numerals only primed as compared with those parts shown in FIGURES 1 and 2. The modified reverse brake coolant supply valve 136' employs a cylindrical valve element 167 secured to the pressure plate 74' instead of the ball 141 which is permitted to move axially in the counterbore 139. The valve element 167 which is slidably mounted in a bore 168 in ring 138' has a reduced diameter end 169 received through a bore 170 in pressure plate 74' and a roll pin 171 is fitted in a radial bore in the projecting left-hand end of the reduced diameter end 169 to secure the valve element 167 to the pressure plate 74'. A conical valve surface 172 provided on the right-hand end of valve element 167 is held in engagement with the valve seat provided by the port 111 during brake release by retraction springs like the retraction springs 76 shown in FIGURES 1 and 2. It should be noted that the retraction springs are not shown in the modification since they are circumferentially spaced from the reduced diameter end 169 to allow for the projecting left-hand end of the reduced diameter end 169. The valve element 167 does not rely upon pressure in port 111 to open the valve like the ball 141 since axial movement of the pressure plate 74' during apply is transmitted through the pin 171 to force the valve surface 172 off its seat.

To illustrate the operation of the coolant system, it will be assumed that the coolant system is charged by the pump 104 only during steering and vehicle brake operation and that the regulator valve 112 is set, for example, to open at approximately 50 p.s.i. in main coolant supply chamber 109. When the vehicle is braked in the straight forward drive in the high drive range, only the high friction clutch 61 is engaged and all other drive establishing devices in drive unit 10 are released. Valves 128 and 136 are thus closed and the coolant system pressure is raised by the input driven pump 104 to 50 p.s.i. whereafter all coolant flow is then directed by the regulator valve 112 to the ground brake coolant chamber 118 to cool the ground brake friction plates 78 which are being subjected to one of their heaviest work duties as they are engaged to brake the vehicle. Since the coolant pressure in chamber 118 is higher than that in coolant chambers 129 and 134, the ring 156 is held against the face 161 of drum 56 to prevent bypassing of the coolant from chamber 118 to chamber 129 and the ring 146 is held against the face 149 of piston 79 to prevent bypassing of the coolant to chamber 134.

The high clutch friction members are enclosed in the chamber 164 formed by the drum 56 and cylinder 96 and this chamber is filled from a lube passage 165 of the transmission's lubricating system which is not shown in detail since it forms no part of this invention. The circulation of lubricant through the high clutch 61 and out through bearing 58 cools the high clutch friction members.

When the ground brake 64 is engaged to brake the vehicle while the drive unit 10 is conditioned for either straight forward drive in the low drive range or straight reverse drive either the low brake coolant supply valve 128 will be opened by the low brake apply piston 88 to permit a portion of the coolant to pass through the control orifice 132 at a controlled rate to the low brake coolant chamber 129 or the reverse brake coolant supply valve 136 will be opened to permit a portion of the coolant to pass through the control orifice 144 at a controlled rate to the reverse brake coolant chamber 134. Under these conditions, the ground friction brake 64 receives the coolant pumped in excess of that required to satisfy the coolant flow at 50 p.s.i. through either orifice 132 and valve 128 or the valve 136 and orifice 144. The duty of the ground friction brake 64 is lower under these conditions and this amount of coolant which may be about half the amount supplied for ground friction braking in the high straight forward drive range is sufficient.

When the valve 128 is open the coolant pressure in chamber 129 is different than that in chamber 118 and the ring 156 is moved by the higher pressure to a position of sealing engagement to maintain the higher coolant pressure in the chamber where it is needed. Under these conditions, coolant pressure in the ground brake coolant chamber 118 urges ring 146 to a sealing position to prevent coolant flow from chamber 118 to the reverse brake coolant chamber 134.

If the reverse brake coolant supply valve 136 is open, the coolant pressure in chamber 134 is different than that in coolant chamber 118 and the higher pressure moves ring 146 to a sealing position to provide a seal between these coolant chambers to maintain the higher coolant pressure in the chamber where it is needed. Under these conditions, the coolant pressure in ground brake coolant chamber 118 urges ring 156 to a sealing position preventing coolant flow from chamber 118 to the low brake coolant chamber 129.

In geared and pivot steering either the low brake apply piston 88 or the reverse brake apply piston 72 in drive unit 10 may be moved to engagement depending on the desired operation and direction of turning. Since these apply pistons are not moved to effect engagement simultaneously either the low brake coolant supply valve 128 or the reverse brake coolant supply valve 136 will be open to the coolant supply but not both. Coolant is then supplied through whichever supply valve is open to cool the friction brake being engaged and the coolant pumped in excess of that required to satisfy the flow at 50 p.s.i. through the open valve and control orifice is delivered to the ground brake coolant chamber 118 which is sufficient to cool the ground friction brake 64 if this brake is engaged to brake the vehicle under any of these conditions. In this manner the coolant in addition to cooling either the low friction brake or the reverse friction brake whichever is engaged is also supplied to cool the ground friction brake for a subsequent engagement. The rings 146 and 156 again effectively prevent the coolant from seeking a fluid path offering less resistance to flow than the working friction members.

When the ground friction brake 64 in drive unit 10 is used for drive brake steering all drive establishing devices in this drive unit are released and therefore the low brake coolant supply valve 128 and the reverse brake coolant supply valve 136 are closed. With valves 128 and 136 closed, the coolant system pressure rises to 50 p.s.i. whereafter all coolant flows to the ground brake coolant chamber 118 to cool the ground brake friction plates 78 which are being subjected to a heavy work duty as they are engaged. Thus, the ground brake receives the same amount of coolant as described under vehicle braking in the high straight forward drive range and the rings 146 and 156 again prevent the coolant from bypassing the ground brake coolant chamber 118.

It will be observed then that there is maximum coolant flow to the ground friction brake when it is engaged to brake the vehicle when there is no steering system in operation and the vehicle is operated in the high drive and when it is engaged to provide drive-brake steering. In addition, there is a controlled rate of flow of a portion of the coolant to the low friction brake when it is used for straight forward drive and steering as well as to the reverse friction brake when it is used for straight reverse drive and steering with the remainder of the coolant being delivered to the ground friction brake for vehicle braking under these several conditions. It will be understood that the coolant system for the right-hand drive unit is the same as the coolant system described above and operates in the same manner.

In applications where the use of the ground friction brake 64 for steering purposes is not desired, the sizes of the low brake control orifice 132 and the reverse brake control orifice 134 may be increased so that at a certain low output speed in low or reverse drive the flow from the pump 104, such flow being proportioned to output speed, will equal the flow through either orifice 132 or orifice 134. This allows the engaged low friction brake 59 or reverse frictioin brake 39 to receive all coolant flow at this low output speed and lower speeds and thus provides for greater heat transfer while at higher speeds there will again be overage available to adequately cool the ground friction brake 64 whose work duty is less since the latter brake is not being used for steering purposes.

The above-described preferred embodiment is illustrative of the invention which may be modified within the scope of the appended claims.

I claim:

1. In a coolant system for cooling the friction devices of a transmission,
   (a) a transmission having a plurality of friction devices,
   (b) a source of coolant and a pump receiving coolant from said source and delivering the coolant under pressure to a supply passage,
   (c) regulator valve means connected to said supply passage and directly to one of said plurality of friction devices operable to maintain the coolant in said supply passage at a predetermined pressure by exhausting overage coolant directly to said one friction device,
   (d) and coolant supply valve means connecting said supply passage to another of said plurality of friction devices normally closed when said another friction device is released to prevent coolant flow to said another friction device and opened when said another friction device is engaged to deliver a portion of the coolant in said supply passage to said another friction device.

2. In a coolant system for cooling the friction devices of a transmission,
   (a) a transmission having a plurality of friction devices,
   (b) a source of coolant and a pump receiving coolant from said source and delivering the coolant under pressure to a supply passage,
   (c) regulator valve means connected to said supply passage and to one of said plurality of friction devices preset to maintain the coolant pressure in said supply passage at a predetermined pressure below the pressure normally delivered by said pump and deliver the excess coolant to said one friction device,
   (d) and coolant supply valve means including flow control means operable to connect said supply passage to another of said plurality of friction devices to deliver coolant at a controlled rate to said another friction device when said another friction device is engaged and to block coolant flow when said another friction device is released.

3. The invention defined in claim 2 and said coolant supply valve means including a control orifice connected at one end to receive coolant from said supply passage and at the other end to deliver coolant to cool said another friction device, said another friction device having an apply piston operable to engage and release said another friction device and being effective to block the delivery of coolant from said flow control orifice when said another friction device is released.

4. The inventioin defined in claim 2 and said coolant supply valve means including a port for delivering coolant in said supply passage to a chamber, said another friction device having an apply piston operable to engage and release said another friction device, a flow control orifice in said apply piston connected to receive coolant from said chamber and deliver coolant at a controlled rate to cool said another friction device, a fixed member adjacent said chamber and said port, a ball mounted in a counterbore in said member, said counterbore being opposite said port and connected to said chamber, engaging means including spring means normally yieldingly holding said ball against a seat provided by said port to prevent the passage of coolant to said counterbore and upon the engagement of said another friction device urged by said apply piston to permit coolant pressure in said port to move said ball from said seat and against a step provided by said counterbore to connect said port to said counterbore.

5. In a coolant system for cooling the friction devices of a transmission,
   (a) a transmission having at least a first, second and third friction device,
   (b) a source of coolant and a pump receiving coolant from said source and delivering the coolant under pressure to a supply passage,
   (c) regulator valve means connected to said supply passage and to said first friction device preset to maintain the coolant pressure in said supply passage at a predetermined pressure below the pressure normally delivered by said pump and deliver the excess coolant to said first friction device,
   (d) coolant supply valve means including flow control means operable to connect said supply passage to said second friction device to deliver a portion of the coolant in said supply passage at a controlled rate to said second friction device when said second friction device is engaged and to block coolant flow when said second friction device is released,
   (e) and coolant supply valve means including flow control means operable to connect said supply passage to said third friction device to deliver a portion of the coolant in said supply passage at a controlled rate to said third friction device when said third friction device is engaged and to block coolant flow when said third friction device is released, whereby said first friction device receives the excess coolant remaining after coolant at said predetermined pressure in said supply passage is delivered at a controlled rate to said second friction device when engaged and to said third friction device when engaged and receives all coolant in said supply passage when said second friction device and said third friction device are released.

6. In a coolant system for a transmission,
   (a) a coolant chamber for a first friction device and a coolant chamber for a second friction device,
   (b) a source of coolant, a supply passage and a pump operable to deliver coolant from said source under pressure to said supply passage,
   (c) regulator valve means connected to said supply passage and to the coolant chamber of said first friction device operable to regulate the coolant pressure in said supply passage to a predetermined pressure below the pressure normaly delivered by said pump and deliver excess coolant to the coolant chamber of said first friction device,
   (d) supply valve means operable to connect said supply passage to the coolant chamber of said second friction device to deliver a portion of the coolant in said supply passage to the coolant chamber of said second friction device when said second friction device is engaged and blocking the flow of coolant when said second friction device is released, (e) and pressure responsive sealing means effective to seal the coolant chamber having the higher coolant pressure from the coolant chamber having the lower coolant pressure.

7. In a coolant system for a transmission,
 (a) a coolant chamber for a first friction device and a coolant chamber for a second friction device,
 (b) a source of coolant, a pump operable to receive coolant from said source and deliver the coolant under pressure to a supply passage,
 (c) regulator valve means connected to said supply passage and to the coolant chamber of said first friction device operable to maintain the coolant pressure in said supply passage at a predetermined pressure below the pressure normally delivered by said pump and deliver excess coolant to the coolant chamber of said first friction device,
 (d) supply valve means operable to connect said supply passage to the coolant chamber of said second friction device to deliver a portion of the coolant in said supply passage to the coolant chamber of said second friction device when said second friction device is engaged with the remainder of the coolant in said supply passage which is pumped in excess of that required to maintain said predetermined pressure being delivered by said regulator valve means to the coolant chamber of said first friction device and said supply valve means blocking the flow of coolant to the coolant chamber of said second friction device when said second friction device is released,
 (e) and sealing means between the coolant chamber of said first friction device and the coolant chamber of said second friction device effective to provide a seal between these coolant chambers in response to a differential pressure so that the coolant chamber having the higher coolant pressure is sealed from the coolant chamber having the lower coolant pressure.

8. The invention defined in claim 7 and said first friction device being a ground brake.

9. The invention defined in claim 7 and said first friction device being a ground brake and said second friction device being a drive establishing device.

10. In a coolant system for a transmission,
 (a) a first coolant chamber for a vehicle ground brake, a second coolant chamber for a forward drive establishing device and a third coolant chamber for a reverse drive establishing device, said first coolant chamber being adjacent to and intermediate said second and third coolant chambers,
 (b) a source of coolant, a pump operable to receive coolant from said source and deliver the coolant under pressure to a supply passage, regulator valve means connected to said supply passage and to said first coolant chamber operable to maintain the coolant pressure in said supply passage at a predetermined pressure and deliver excess coolant to said first coolant chamber to cool said vehicle ground brake,
 (c) first supply valve means including a control orifice operable to connect said supply passage to said second coolant chamber when said forward drive establishing device is engaged to deliver a portion of the coolant in said supply passage at a controlled rate to cool said forward drive establishing device and blocking the flow of coolant when said forward drive establishing device is released,
 (d) second supply valve means including a control orifice operable to connect said supply passage to said third coolant chamber when said reverse drive establishing device is engaged to deliver a portion of the coolant in said supply passage to cool said reverse drive establishing device and blocking the flow of coolant when said reverse drive establishing device is released,
 (e) sealing means separating said first coolant chamber and said second coolant chamber and being operable to effect a seal between said first and second coolant chambers in response to a differential pressure to seal that coolant chamber having the higher coolant pressure from that coolant chamber having the lower coolant pressure,
 (f) and another sealing means separating said first coolant chamber and said third coolant chamber and being operable to effect a seal between said first and third coolant chambers in response to a differential pressure to seal that coolant chamber having the higher coolant pressure from that coolant chamber having the lower coolant pressure.

11. In a coolant system for a cross-drive transmission,
 (a) a cross-drive transmission having separate drive units operable to provide a plurality of different ratio drives to separate output means and a plurality of different steering systems,
 (b) separate coolant chambers for the friction devices of each said drive unit including a first coolant chamber for a vehicle ground brake, a second coolant chamber for a low ratio drive establishing device and a third coolant chamber for a reverse ratio drive establishing device,
 (c) a pump in each said drive unit for supplying coolant under pressure to a supply passage,
 (d) regulator valve means in each drive unit connected to said supply passage and to said first coolant chamber and being operable to maintain the coolant pressure in said supply passage at a predetermined pressure below the pressure normally delivered by said pump and deliver excess to said first coolant chamber to cool said vehicle ground brake,
 (e) a low drive coolant supply valve including a flow control orifice in each said drive unit operable only when said low ratio drive establishing device is engaged to deliver a portion of the coolant in said supply passages at a controlled rate to said second coolant chamber to cool said low ratio drive establishing device with the remainder of coolant in said supply passage being delivered by said regulator valve means to said first coolant chamber to cool said vehicle ground brake,
 (f) a reverse drive coolant supply valve including a flow control orifice in each said drive unit operable only when said reverse ratio drive establishing device is engaged to deliver a portion of the coolant in said supply passage at a controlled rate to said third coolant chamber to cool said reverse ratio drive establishing device with the remainder of the coolant in said supply passage being delivered by said regulator valve means to said first coolant chamber to cool said vehicle ground brake,
 (g) sealing means in each said drive unit between said first coolant chamber and said second coolant chamber operable to seal that coolant chamber having the higher coolant pressure from that chamber having the lower coolant pressure,
 (h) and sealing means in each said drive unit between said first coolant chamber and said third coolant chamber operable to seal that coolant chamber having the higher coolant pressure from that coolant chamber having the lower coolant pressure.

12. In a transmission,
 (a) input means and output means,
 (b) drive means operable to drivingly connect said input means to said output means including a drive establishing friction device normally released and operable when engaged to establish a drive,
 (c) a brake friction device normally released and operable when engaged to brake said output means,
 (d) and a coolant system having coolant under pressure operable to deliver the coolant only to said brake friction device when said drive establishing friction device is released and to deliver a portion of the coolant to said drive establishing device when engaged and the remaineder of the coolant to said brake friction device.

13. The invention defined in claim 12 and said coolant system being operable to deliver a portion of the coolant at a controlled rate to said one drive establishing device when engaged.

14. In a transmission,
   (a) input means and output means,
   (b) drive means operable to drivingly connect said input means to said output means including a drive establishing friction device normally released and operable when engaged to establish a drive,
   (c) a brake friction device normally released and operable when engaged to brake said output means,
   (d) and a coolant system having coolant under pressure operable to deliver all coolant available to said brake friction device in excess of that required to maintain a predetermined pressure when said drive establishing friction device is released and to deliver a portion of the coolant at said predetermined pressure at a controlled rate to said drive establishing device when engaged and the remainder of the coolant to said brake friction device in excess of that required to maintain said predeterminted pressure.

15. In a transmission,
   (a) input means and output means,
   (b) drive means operable to drivingly connect said input means to said output means including a drive establishing friction device normally released and operable when engaged to establish a drive,
   (c) a brake friction device normally released and operable when engaged to brake said output means,
   (d) said drive establshiing friction device and said brake friction device each having a coolant chamber for receiving coolant,
   (e) sealing means separating said coolant chambers responsive to differential pressures to seal that coolant chamber having a higher coolant pressure from that coolant chamber having a lower coolant pressure,
   (f) and a coolant supply system having coolant under pressure operable to deliver the coolant only to the coolant chamber of said brake friction device when said drive establishing friction device is released and to deliver a portion of the coolant to the coolant chamber of said drive establishing device when engaged and the remainder of the coolant to the coolant chamber of said brake friction device.

16. In a transmission,
   (a) input means and output means,
   (b) drive means operable to drivingly connect said input means to said output means including a drive establishing friction device normally released and operable when engaged to establish a drive,
   (c) a brake friction device normally released and operable when engaged to brake said output means,
   (d) said drive establishing friction device and said brake friction device each having a coolant chamber,
   (e) sealing means separating said coolant chambers responsive to differential pressures to seal that coolant chamber having a higher coolant pressure from that coolant chamber having a lower coolant pressure,
   (f) a coolant supply system for supplying coolant under pressure to said coolant chambers including a pump receiving coolant from a source and delivering the coolant under pressure to a supply passage,
   (g) regulator valve means operable to maintain the coolant pressure in said supply passage at a predetermined pressure below that normally delivered by said pump and deliver overage to the coolant chamber of said brake friction device,
   (h) and supply valve means operable to connect said supply passage to the coolant chamber of said drive establishing devices normally closed to block coolant flow when said drive establishing friction device is released and opened when said drive establishing friction device is engaged to deliver a portion of the coolant in said supply passage to the coolant chamber of said drive establishing friction device, whereby said regulator valve means delivers to the coolant chamber of said brake friction device the excess of coolant delivered by said pump over that required to maintain said predetermined pressure when said supply valve means is opened.

17. In a transmission,
   (a) input means and output means,
   (b) variable ratio drive means operable to drivingly connect said input means to said output means in a plurality of different ratio drives including drive establishing friction devices normally released and operable when selectively engaged to selectively establish said different ratio drives,
   (c) a brake friction device normally released and operable when engaged to brake said output means,
   (d) said drive establishing friction devices and said brake friction device each having a coolant chamber,
   (e) sealing means between said coolant chambers responsive to differential pressures to seal that coolant chamber having a higher coolant pressure from that coolant chamber having a lower coolant pressure,
   (f) a coolant supply system for supplying coolant under pressure to said coolant chambers including a pump receiving coolant from a source and delivering the coolant under pressure to a supply passage,
   (g) regulator valve means operable to maintain the coolant pressure in said supply passage at a predetermined pressure below that normally delivered by said pump and deliver overage to the coolant chamber of said brake friction device,
   (h) first supply valve means including flow control means operable to connect said supply passage to the coolant chamber of one of said drive establishing friction devices normally closed to block coolant flow when said one drive establishing friction device is released and opened when said one drive establishing friction device is engaged to deliver a portion of the coolant in said supply passage at a controlled rate to the coolant chamber of said one drive establishing friction device, whereby said regulator valve means delivers to the coolant chamber of said brake friction device the excess of coolant delivered by said pump over that required to maintain said predetermined pressure when said first supply valve means is opened,
   (i) and second supply valve means including flow control means operable to connect said supply passage to the coolant chamber of another of said drive establishing friction devices normally closed to block coolant flow when said another drive establishing friction device is released and opened when said another drive establishing device is engaged to deliver a portion of the coolant in said supply passage at a controlled rate to the coolant chamber of said another drive establishing friction device, whereby said regulator valve means delivers to the coolant chamber of said brake friction device the excess of coolant delivered by said pump over that required to maintain said predetermined pressure when said second supply valve means is opened.

18. In a cross-drive transmission,
   (a) input means and right and left output means,
   (b) a right and a left drive unit operable to drivingly connect said input means to said right and left output means respectively in a plurality of different ratio drives including a reverse ratio drive, a forward low ratio drive and a forward high ratio drive, (c) a right and a left low drive friction device each having an operating motor and a coolant chamber and being normally released and operable when engaged by the operation of said motor to selectively establish respectively said forward low ratio drive in said right and left drive unit, (d) a right and a left high drive friction device normally released and operable when engaged to selectively establish respectively said forward high ratio drive in said right and left drive unit, (e) a right and a left reverse drive friction device each having an operating motor and a coolant chamber and being normally released and operable when engaged by the operation of said motor to selectively establish respectively said reverse ratio drive in said right and left drive unit, (f) a right and a left ground brake friction device in said right and left drive unit respectively each having an operating motor and a coolant chamber and being normally released and operable when engaged by the operation of said motor to brake said right and left output means respectively, (g) a right and a left coolant supply system for delivering coolant under pressure to said coolant chambers in said right and left drive unit respectively, (h) said right coolant supply system including a source of coolant, a pump receiving coolant from said source and delivering the coolant under pressure to a supply passage, regulator valve means maintaining the coolant in said supply passage at a predetermined pressure and delivering overage to the coolant chamber of said right ground brake friction device, first supply valve means including flow control means operated by the motor of said right reverse friction device normally closed when said right reverse drive friction device is released and being opened when said right reverse drive friction device is engaged by the operation of the motor to deliver a portion of the coolant in said supply passage to the coolant chamber of said right reverse drive friction device at a controlled rate and second supply valve means including flow control means operated by the motor of said right low drive friction device normally closed when said right low friction device is released and being opened when said right low drive friction device is engaged by the operation of the motor to deliver a portion of the coolant in said supply passage to the coolant chamber of said right low drive friction device at a controlled rate, (i) and said left coolant supply system including a source of coolant, a pump receiving coolant from said source and delivering the coolant under pressure to a supply passage, regulator valve means maintaining coolant in said supply passage at a predetermined pressure and delivering overage to the coolant chamber of said left ground brake friction device, first supply valve means including flow control means operated by the motor of said left reverse drive friction device normally closed when said left reverse drive friction device is released and being opened when said left reverse drive friction device is engaged by the operation of the motor to deliver a portion of the coolant in said supply passage to the coolant chamber of said left reverse drive friction device at a controlled rate and second supply valve means including flow control means operated by the motor of said left low drive friction device normally closed when said left low drive friction device is released and being opened when said left low drive friction device is engaged by the operation of the motor to deliver a portion of the coolant in said supply passage to the coolant chamber of said left low drive friction device at a controlled rate.

19. The invention defined in claim 18 and said first supply valve means including said flow control means of said right and left coolant supply system unit comprising a port for delivering coolant in the supply passage to a delivery chamber, the motor of the reverse drive friction device having an apply piston and a pressure plate engaged by said apply piston to engage the reverse drive friction device, a flow control orifice in said apply piston connected to receive coolant from said delivery chamber and deliver coolant at a controlled rate to the coolant chamber of the reverse drive friction device, a fixed member adjacent said delivery chamber and said port, a ball mounted in a counterbore in said delivery chamber, said counterbore being opposite said port and connected to said delivery chamber, spring means engaging said pressure plate prestressed to urge said pressure plate against said apply piston and said ball to yieldingly hold said apply piston in a release position and said ball on a seat provided by said port to prevent the passage of coolant to said counterbore and upon the movement of said apply piston to engage the reverse drive friction device, said apply piston urging said pressure plate against the bias of said spring means to permit coolant pressure in said port to move said ball off said seat and against a step provided by said counterbore to connect said port to said counterbore.

20. The invention defined in claim 18 and said second supply valve means including said flow control means of said right and left coolant supply system comprising a flow control orifice connected at one end to the supply passage and at the opposite end to the coolant chamber of the low drive friction device, the motor of the low drive friction device having an apply piston which blocks said opposite end of said flow control orifice when said apply piston is released and opens said opposite end when said apply piston is moved to engage the low drive friction device.

21. The invention defined in claim 18 and said first supply valve means including said flow control means of said right and left coolant supply system comprising a port connected to said supply passage, the motor of the reverse drive friction device having an apply piston and a pressure plate engaged by said supply piston to engage the reverse drive friction device, a flow control orifice in said apply piston for delivering coolant from said port at a controlled rate to the coolant chamber of the reverse drive friction device, a valve element having a conical valve surface engageable with a valve seat provided by said port to prevent the passage of coolant from said port to said flow control orifice, said valve element being secured to said pressure plate, spring means engaging said pressure plate prestressed to urge said pressure plate against said apply piston to yieldingly hold said apply piston in a released position and to yieldingly hold said conical valve surface on said valve seat and upon movement of said apply piston to engage the reverse drive friction device said apply piston urging said pressure plate against the bias of said spring means whereby said valve element is moved conjointly with said pressure plate and said conical valve surface is moved off said valve seat to connect said port to said flow control orifice.

22. The invention defined in claim 2 and said coolant supply valve means including a port connected to said supply passage, said another friction device having an apply piston operable to engage and release said another friction device, a flow control orifice in said apply piston for delivery of coolant from said port at a controlled rate to cool said another friction device, a pressure plate moved by said apply piston to engage said another friction device, prestressed spring means effective to return said pressure plate when said apply piston is released, a valve element having a conical valve surface engageable with a valve seat provided by said port to prevent the passage of coolant from said port to said flow control orifice, said valve element being secured to said pressure plate whereby said spring means is effective to hold said conical valve surface on said valve seat when said apply piston is released and upon engagement said pressure plate when moved by said apply piston is effective to move said conical valve surface off said valve seat.

References Cited by the Examiner

UNITED STATES PATENTS 2,930,257  3/1960  Christenson _____ 192—113 X

FRED C. MATTERN, Jr., *Primary Examiner.*

DAVID J. WILLIAMOWSKY, *Examiner.*

J. R. BENEFIEL, *Assistant Examiner.*